United States Patent [19]
Weterrings et al.

[11] Patent Number: 5,934,573
[45] Date of Patent: Aug. 10, 1999

[54] MEASURING DISPENSER-SPREADER AND METHOD

[75] Inventors: Frans M. Weterrings; Rodney W. Robbins; Larry J. Sexton, all of Florence, Ala.

[73] Assignee: Restaurant Technology, Inc., Oak Brook, Ill.

[21] Appl. No.: 08/813,671

[22] Filed: Mar. 7, 1997

[51] Int. Cl.[6] .............................. A01C 7/02; G01F 11/28
[52] U.S. Cl. ..................... 239/650; 239/379; 239/451; 239/537; 239/538; 239/540; 239/555; 239/562; 239/652; 222/361; 222/441; 222/452
[58] Field of Search ..................... 239/650, 652, 239/681, 302, 379, 451, 455, 537, 538, 540, 555, 562, 518, 520, 523; 222/452, 361, 441

[56] References Cited

U.S. PATENT DOCUMENTS

| | | |
|---|---|---|
| 152,909 | 7/1874 | McSkimin ............................. 222/452 |
| 509,830 | 11/1893 | Long, Jr. . |
| 928,052 | 7/1909 | Hirsch . |
| 1,005,130 | 10/1911 | Andrews . |
| 1,361,146 | 12/1920 | Egnatoff . |
| 1,400,757 | 12/1921 | Malusz ............................... 222/452 X |
| 1,607,530 | 11/1926 | Guest . |
| 2,393,454 | 1/1946 | Bailey ................................. 222/452 X |
| 2,515,735 | 7/1950 | Saunders . |
| 2,815,153 | 12/1957 | McCarthy . |
| 2,877,937 | 3/1959 | Weir ....................................... 222/452 |
| 3,945,511 | 3/1976 | Delorme ............................. 222/564 X |
| 4,785,976 | 11/1988 | Bennie et al. ...................... 239/555 X |
| 5,245,949 | 9/1993 | Hively .................................. 119/53.5 |
| 5,490,615 | 2/1996 | Robbins et al. . |
| 5,746,355 | 5/1998 | Wold ................................. 222/441 X |

*Primary Examiner*—Andres Kashnikow
*Assistant Examiner*—Robin O. Evans
*Attorney, Agent, or Firm*—Ryndak & Lyerla

[57] ABSTRACT

The dispenser dispenses and spreads measured quantities of granular materials over a relatively wide area. A plurality of individual measurement chambers are distributed throughout a disc or rectilinear panel which is moved relative to other discs or panels with similarly shaped and spaced holes to first cover the inlet to the chambers to prevent unwanted leakage of material from the interior of the container, and to then open the outlet to each of the chambers to dispense material. A deflector is positioned below the dispenser outlets to spread the dispersed materials over an even wider area. The dispenser is used advantageously to spread seasonings and other food materials onto spread-out food items such as french fries and popcorn, large kettles and vats, etc.

27 Claims, 5 Drawing Sheets

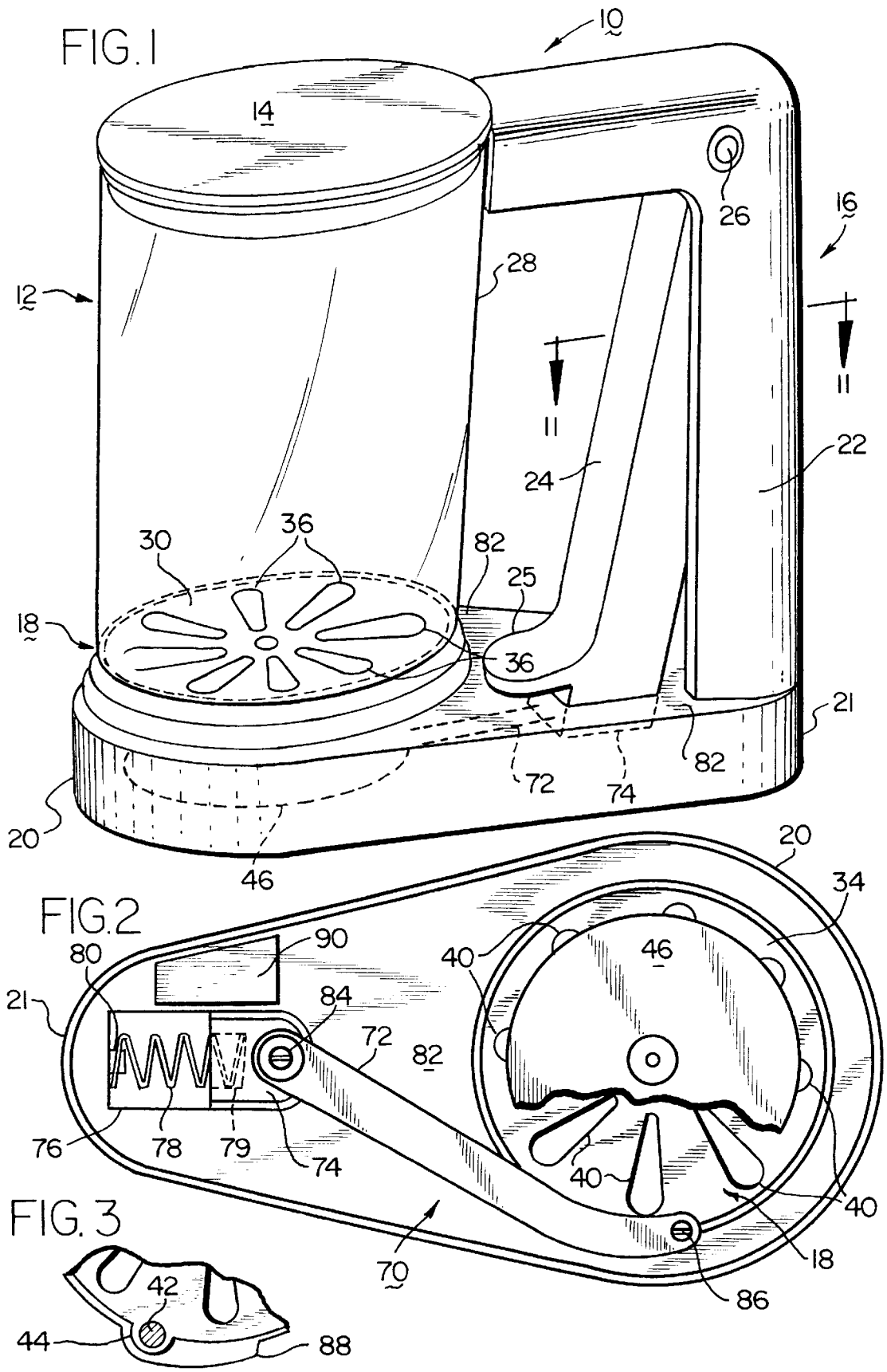

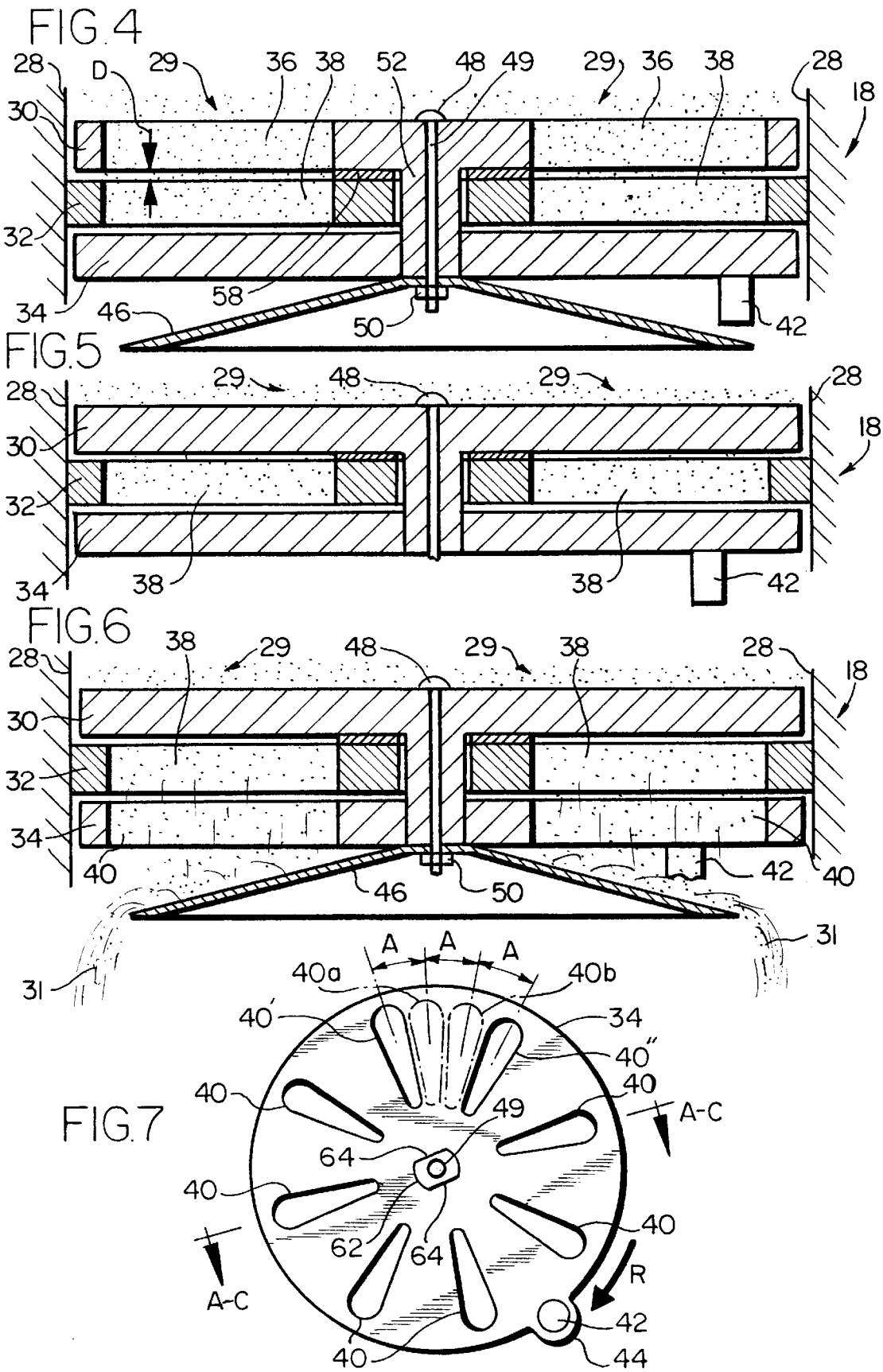

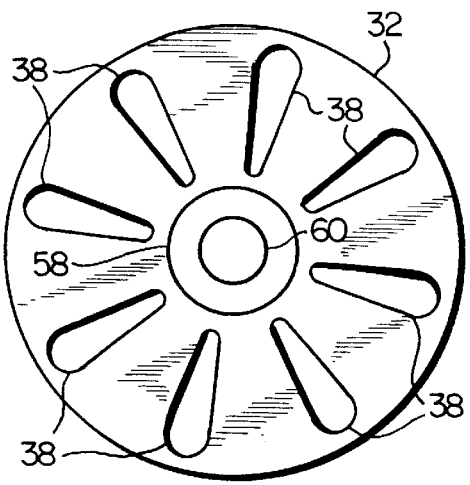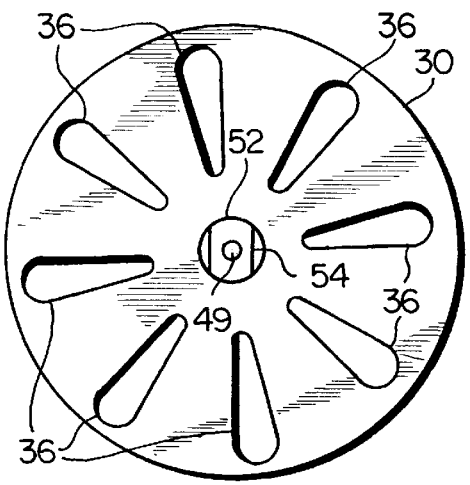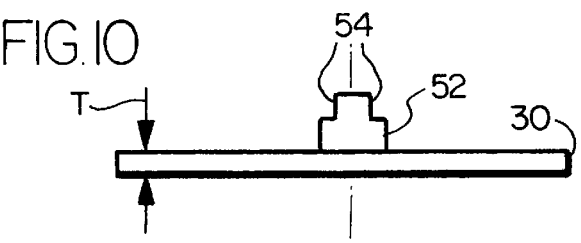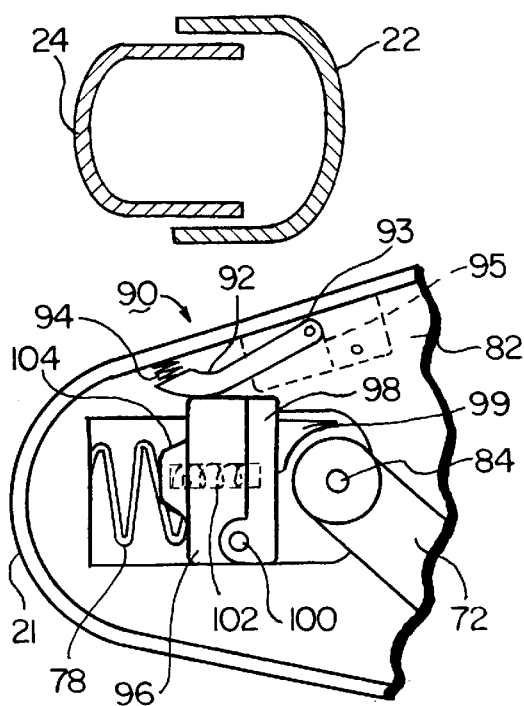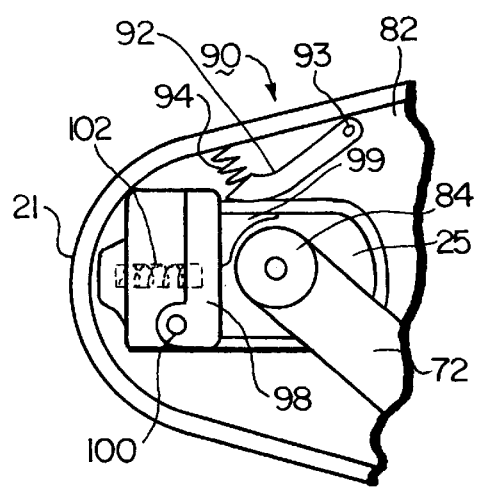

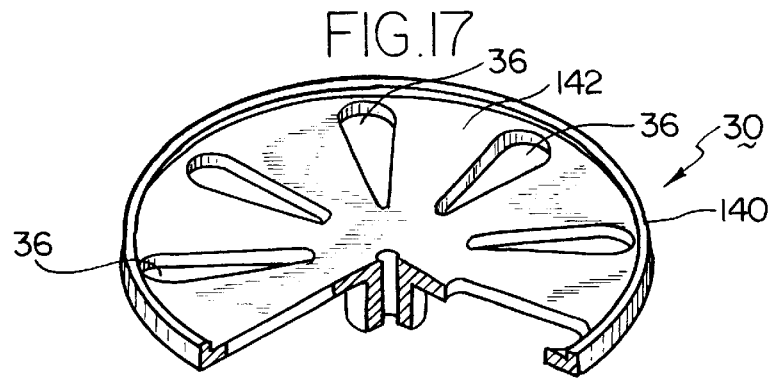
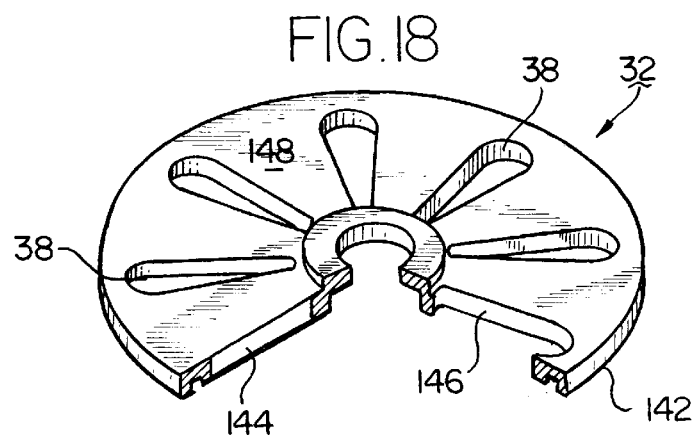
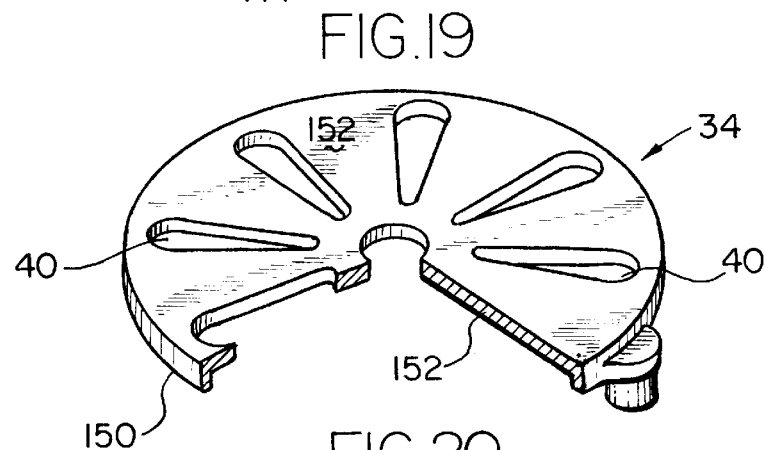
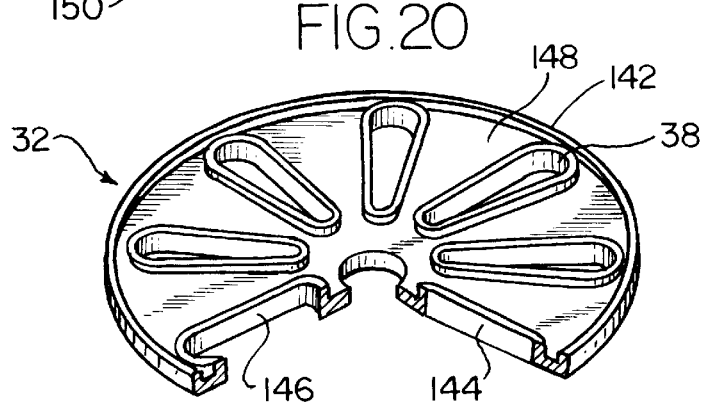

MEASURING DISPENSER-SPREADER AND METHOD

This invention relates to measuring dispensers and methods, and particularly to measuring dispensers of granular food materials.

In some food preparation operations, such as the volume production of french fries in a fast-food restaurant, or the making of popcorn in a movie theater, it is required to dispense condiments in relatively substantial quantities on relatively large, spread-out or batches of food.

The usual method of salting large batches of french fries, for example, is simply to spread the french fries out on a table, and, using a large metal salt shaker, shake an amount onto the french fries which is believed by the cook to be appropriate.

In some restaurants, and particularly in fast-food restaurants, the cooks often are relatively inexperienced. Therefore, they often apply the wrong amount of salt to the french fries. This results either in inadequately salted and tasteless french fries, or excessively salted and inedible french fries, both of which are highly undesirable. The salting of batches of popcorn in a movie theater often suffers from much the same problems.

Various measuring dispensers have been suggested in the past for measuring and dispensing granular food substances such as salt. Many of such measuring dispensers dispense the measured quantity of granular materials from a single outlet opening. This is desirable in many uses, but is not desirable when it is desired to spread the materials over a relatively large surface area, such as on the surface of a batch of french fries spread out on a broad surface.

Another example where dispersion of the dispensed material over a broad surface area is desirable is a large kettle or vat of food which is difficult to stir. It is difficult to stir the contents to disperse quantities of seasonings which are deposited in a relatively small area. Spreading the seasoning over the surface can reduce the amount of stirring required.

Other problems with dispensing containers suggested in the past are that they are relatively clumsy to use, or require two hands to use, or do not dispense large enough quantities of materials with each dispensing operation and thus are slow to use.

Further problems with such prior devices include undue complexity and manufacturing expense, lack of robustness for use in high-production cooking or other operations, and tendency for the dispensing devices to tip over when placed at rest on a horizontal surface.

In accordance with the foregoing, it is an object of the present invention to provide a measuring dispenser which alleviates or overcomes the foregoing problems.

In particular, it is an object of the present invention to provide a measuring dispenser which dispenses materials over a relatively broad area.

Another object is to provide such a device which easily can be used with one hand.

A further object of the invention is to provide such a device which is capable of dispensing relatively large quantities of materials during each dispensing operation.

An additional object of the invention is to provide such a device which is robust, stable when resting on a horizontal support surface, relatively simple and reliable in operation and which is relatively inexpensive to manufacture.

In accordance with the present invention, the foregoing objects are met by the provision of a measuring dispenser and method in which measured quantities of a material are dispensed from a plurality of widely dispersed measurement cavities during each operation of the device, thereby spreading the measured quantities over a relatively wide surface area.

In one embodiment of the invention, measuring containers are formed having a plurality of superimposed discs with holes in them. A plurality of measuring cavities is formed in one of the discs, and the other discs are rotated so as to first close the top of each cavity, and then open the bottom of the cavity to dispense materials from each of the cavities during a single operation of the device. Preferably, the cavities are emptied substantially simultaneously.

It is further preferred that in this embodiment there are three discs, each having holes of the same shape, size and angular spacing from one another. The top and bottom discs are fastened together. The middle of the three discs and the unit formed of the first and third discs rotate relative to one another to perform the functions described above.

In accordance with another feature of the present invention, the bottom wall of a container is formed by a measuring dispensing mechanism. A handle is secured to the exterior of the container, and has a squeeze-type actuating lever which operates the dispensing mechanism at the bottom of the container. This mechanism easily can be operated with one hand.

Preferably, a hollow base member is provided, and a linkage connecting the actuating lever with the dispensing mechanism is contained within the base.

It also is preferred that the motion of the dispensing mechanism created by the handle be reciprocating so as to enable the use of a simple crank mechanism for operation.

In another embodiment of the invention, linear motion of superimposed perforated panels is used instead of rotary motion of discs. In this embodiment, the linkage of the handle lever to the dispensing structure is particularly simple and easy to implement.

In general, each hole in the top disc or panel should be spaced from the corresponding hole in the bottom panel by twice the width of each hole in the direction of motion. The spacing of adjacent holes on each disc or panel from one another should be at least three times that hole width.

It is preferred that a sloping deflector be secured to each of the dispensing mechanisms underneath the dispensing holes so as to spread the materials being dispensed over an even wider area than that covered by the dispersed openings of the measuring cavities.

The foregoing and other objects and advantages of the invention will be set forth in or apparent from the following specification and drawings.

In the method of the invention, this highly advantageous measuring dispenser is used to spread seasonings or other foods materials over food items spread out over a widespread area.

IN THE DRAWINGS

FIG. 1 is a perspective view of one embodiment of the measuring dispenser of the present invention;

FIG. 2 is a bottom plan view of the dispenser shown in FIG. 1;

FIG. 3 is a partially cross-sectional view of a portion of the mechanism shown in FIG. 2;

FIGS. 4, 5 and 6 are cross-sectional views of one embodiment of the dispensing mechanism of the present invention, each of FIGS. 4–6 showing the parts of the dispensing mechanism in a different location relative to one another;

FIG. 7 is a bottom plan view of one of the discs of in FIGS. 4–6;

FIG. 8 is a top plan view of another of the discs shown in FIGS. 4–6;

FIG. 9 is a bottom plan view of another of the discs shown in of FIGS. 4–6;

FIG. 10 is a side elevation view of the disc shown in FIG. 9;

FIG. 11 is a cross-sectional view taken along line 11—11 of FIG. 1;

FIGS. 12 and 13 are partially broken-away bottom plan views of the device shown in FIGS. 1 and 2 showing the operation of one of the features of the invention;

FIGS. 17–19 are top perspective views, partially broken-away, showing modified discs of the present invention; and FIG. 20 is a bottom perspective view of the disc shown in FIG. 18.

GENERAL DESCRIPTION

Figure 14:
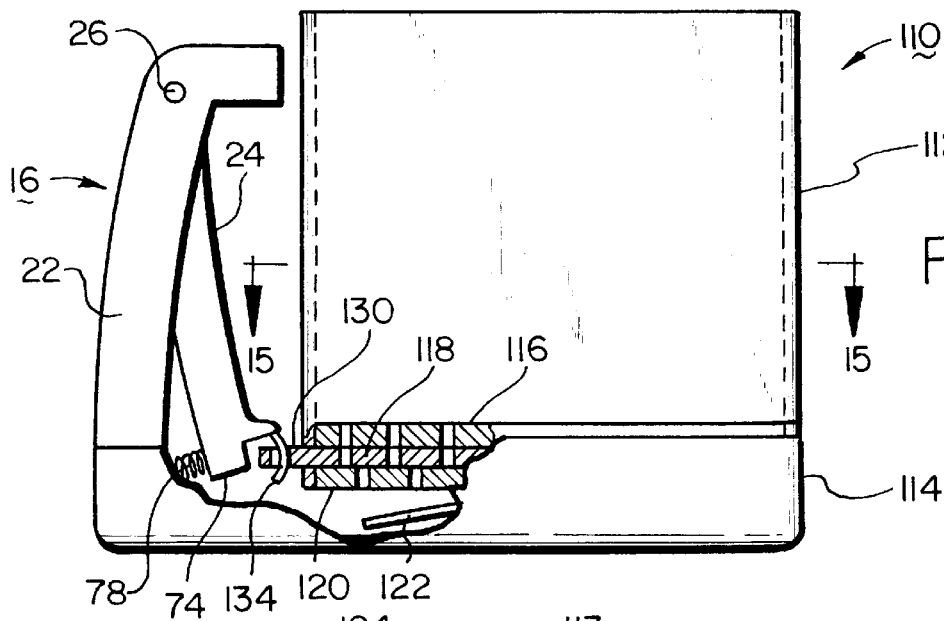
FIG. 14 is a side elevation view, partially broken-away, of another embodiment of the invention.

FIG. 1 shows a measuring dispenser 10 constructed in accordance with the present invention. The dispenser 10 includes a cylindrical container 12 having a transparent or translucent side wall 28 and a removable cover 14. Attached to the container 12 is a handle structure 16. The bottom wall of the container 12 is formed by a dispensing mechanism indicated generally at 18 which dispenses materials downwardly from the bottom of the dispenser.

A hollow base member 20 is secured to the bottom of the container 12, and supports the handle structure 16 and the container 12.

The handle structure 16 includes a hollow handle member 22 extending upwardly from the outwardly extended right end 21 of the base member 20. A lever 24 is pivoted to the handle member 22 at a location 26 substantially above the base member 20.

Figure 15:
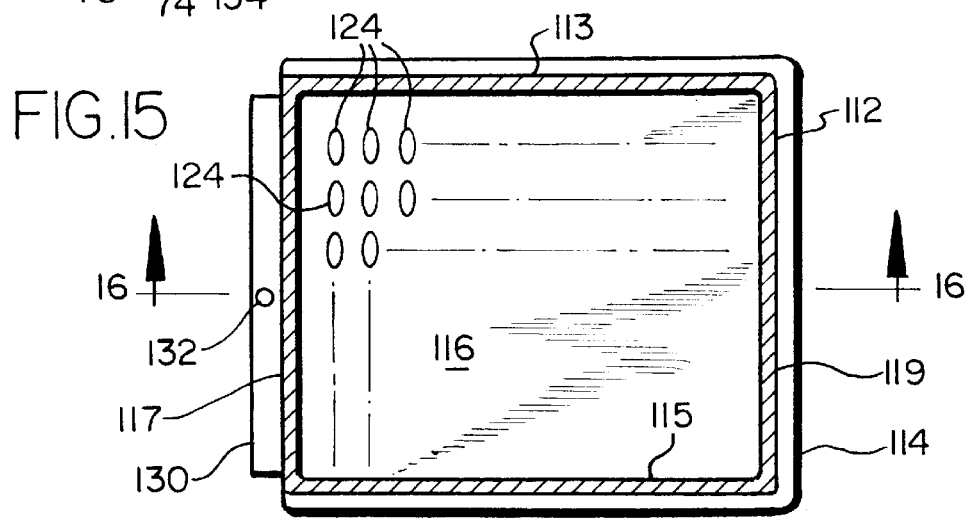
FIG. 15 is a cross-sectional view, taken along line 15—15 of FIG. 14.
Figure 16:
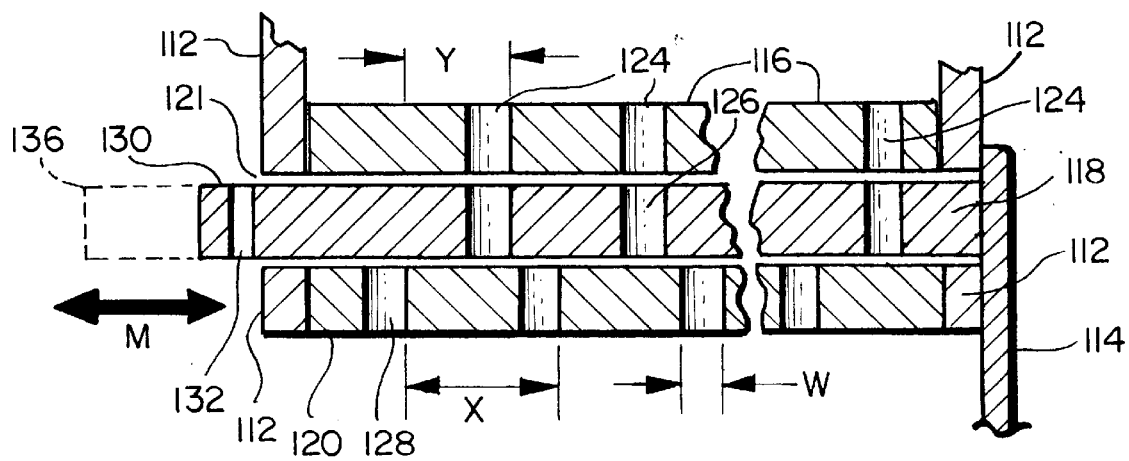
FIG. 16 is an enlarged, broken-away and partially schematic cross-sectional view taken along line 16—16 of FIG. 15.

FIGS. 1–13 show a dispenser in which the dispensing mechanism is rotary, and FIGS. 14–16 show an embodiment in which the dispensing mechanism is linear. Both embodiments spread substantial measured quantities of material over a relatively wide area with each operation.

ROTARY DISPENSING MECHANISM

The dispensing mechanism 18 is shown in FIGS. 1 and 2 and is shown in cross-section in FIGS. 4–6.

Referring first to FIG. 4, the dispensing mechanism 18 includes three superimposed discs 30, 32 and 34. The middle disc 32 is secured at its outer edge to the inside surface of the container cylinder wall 28.

Each of the upper and lower discs 30 and 34 is slightly smaller in diameter than the inside of the cylinder forming the container.

The upper and lower discs 30 and 34 are secured together in a fixed, pre-determined angular relationship to one another, by means to be described in greater detail below.

As it can be seen in FIGS. 1 and 2, but most particularly in FIGS. 7, 8, and 9, each of the discs has a plurality of elongated holes or slots extending radially away from the center of the disc.

Referring to FIGS. 1 and 9, the uppermost disc 30 has eight slots 36 located angularly equidistant from one another and extending radially outwardly.

Referring to FIG. 8, as well as FIG. 4, the middle disc 32 has eight slots 38 of the same size, shape and location relative to the center of the disc as the slots in the upper disc 30.

Finally, the lower disc 34 has eight slots of the same size, angular location relative to one another, and shape as the slots 36 and 38. Preferably, each of the slots is narrower at its radially innermost end than at its outermost end, so as to maximize the surface area of each slot within the space available for it.

As it is shown in FIG. 10, the upper disc 30 has an integral shaft 52 extending from its center with two flats 54 formed at a point spaced outwardly from the disc 30.

The central disc 32 has a central hole 60 which is slightly larger in diameter than the diameter of the shaft 52 extending from the top disc 30 so that the shaft 52 can rotate easily in the hole 60.

Referring now to FIG. 7, the bottom disc 34 has a central hole 62 which is circular except that it has flatted areas 64 which match the flatted portions 54 of the shaft 52 (see FIGS. 9 and 10). Thus, the disc 34 can be fitted on to the end of the shaft 52 and aligned permanently with the slots on disc 34 in a predetermined angular orientation relative to those on the upper disc 30.

Still referring to FIG. 7, as well as FIGS. 4, 5 and 6, a crank pin 42 extends from a projection 44 extending outwardly from the rim of the lowermost disc 34. This crank pin is used to drive the disc assembly consisting of the upper and lower discs secured together.

Now referring to FIGS. 4 and 6, a deflector member 46 is secured to the dispenser assembly 18 by means of a threaded fastener 48 extending through a central hole 49 in the shaft 52 and fastened with a nut 50. The fastener 49 extends through a hole in the center of the frustro-conically-shaped deflector 46. Thus, the deflector 46 is used to help hold the discs 30 and 34 together.

The operation of the dispensing mechanism 18 and the relative spacing of the holes of the discs now will be explained with reference to FIGS. 4, 5, 6 and 7.

FIG. 4 shows the starting position of the discs relative to one another. In this position, the holes 36 in the upper disc are aligned with the holes 38 in the fixed central disc 32, and the solid material between adjacent slots of the lower disc 34 blocks the outlets of the holes 38. The holes 38 in the fixed central disc form measuring containers or chambers. The amount of material contained by the cavities 38 can be varied by changing the thickness of the disc 32. The material 29 to be dispensed fills each of the cavities 38.

FIG. 5 shows the discs in an intermediate position during one cycle of operation of the dispensing mechanism. As it is shown in FIG. 7, the bottom disc 34 is rotated in the direction of the arrow "R". As the disc rotates one step, which is defined by the angle "A" in FIG. 7, the disc 30 also has rotated one step so that the top of each measuring cavity 38 now is covered by solid material between adjacent holes in the disc 30 to prevent granular material 29 from flowing into any of the cavities 38. The bottom of each cavity still is covered by bottom disc 34.

When the disc assembly consisting of the upper and lower discs 30 and 34 has rotated another step "A" to the position shown in FIG. 6, the top of each cavity 38 still is covered by the upper disc, whereas the holes 40 of the lower disc now are aligned with the holes 38 and allow the granular material to fall downwardly from the cavities.

As it can be seen in FIG. 6, the granular material falling out of the holes hits the sloping surface of the deflector 46 and is spread outwardly in a pattern indicated at 31 to spread the material over a relatively broad area. Thus, for example, with discs approximately 2.5 inches in diameter, the circular distribution pattern for salt dispensed from the dispenser can be eight or more inches in diameter.

The angular relationship of the top and bottom discs to one another is illustrated in FIG. 7. The slots in each of the three discs are located at an angular distance from one another equal to three times the width of one of the slots. This is illustrated by showing in dashed lines two slot positions 40a and 40b between two adjacent slots shown in full lines at 40' and 40". Since there are eight slots in each disc, the angular spacing between adjacent slots is approximately 90°. The angle "A" is approximately 15°, or one-third of the 45° angle between adjacent slots.

Following is the sequence of events which occurs to create the operation illustrated in FIGS. 4–6:

1. With the three discs at their rest or starting position, as shown in FIG. 4, the top slots 36 and the slots 38 in the middle disc are aligned vertically with one another at the position shown in dashed lines at 40b in FIG. 7. This position is angularly spaced two slot widths away from the position of slot 40', in the bottom disc.

2. At the midpoint of travel of the disc assembly, slot 40' has moved clockwise (in the direction of arrow "R") one step to the position 40a, and slot 36 which started at position 40b moves to position 40", where the solid areas of the disc 30 still cover the top of the hole 38.

3. At the end point of travel of the disc assembly, the slot 40' in the bottom disc 34 moves to position 40b where it is aligned with one of the chambers 38 in the middle disc, thus allowing the contents of the chamber to be emptied. Simultaneously, the upper hole 36 moves clockwise one step further, where the solid material of the top disc still covers the hole 38. This description applies to each of the holes in the discs.

4. Both discs return counterclockwise to the starting position shown in FIG. 4, at which the granular material 29 falls into the cavities 38 through the openings 36. The mechanism then is prepared for another dispensing movement.

The angular spacing of the slots in the discs from one another should be equal to at least three times the width of the slots, but can be greater than that if desired, as it might be if a disc with fewer then eight slots is used. Of course, the width of the slots then could be increased to keep the relative spacing the same.

Referring to FIGS. 4 and 8 through 10, the central disc 32 and the lower disc 34 bear against one another relatively tightly. An upstanding boss 58 on the central disc 32 (FIGS. 4 and 8) spaces the top and middle discs from one another by a distance "D" (FIG. 4). Distance "D" is made relatively large in order to allow granular material to pass between the discs without causing the discs to jam, but not so large that dispensed material leaks through the gap.

Thus, for example, with table salt, the average diameter of each grain is about 0.002 inch. The distance "D" is set at twice that dimension, 0.004 inch. This prevents both jamming and leakage.

ACTUATING MECHANISM

Referring again to FIGS. 1–3, the actuating mechanism includes the handle 22, the pivoted lever 24 and a linkage indicated generally at 70 in FIG. 2 which drives the lower disc 34 and, hence, the upper disc 30 in a reciprocating motion.

As it is shown in dashed lines in FIG. 1, and in FIG. 2, the lower end 74 of the lever 24 extends downwardly through a hole 76 in the upper wall 82 of the base 20. The lower end 74 of the lever 24 has a circular cavity 79 into which a coil spring 78 is fitted. The opposite end of the coil spring extends around a post 80 which extends inwardly from the inner surface of the hollow handle member 22. The coil spring biases the lower end 74 of the lever 24 towards the right as it is shown in FIG. 2 to return the dispensing mechanism to its rest or starting position.

A crank arm 72 is pivotably attached at 84 to the lower end 74 of the lever 24, and is pivotably attached at its other end 86 to the crank pin 42 extending from the bottom surface of the lower disc 34. The projection 44 from which the post 42 fits into a groove 88 in the wall 82 (also see FIG. 3) which acts as a limit-setting structure to restrict the angular movement of the discs relative to one another. The angular extent of the motion of the discs is limited to approximately twice the angle "A" (FIG. 7).

FIG. 11 is a cross-sectional view taken along line 11—11 of FIG. 1. This shows that each of the handle member 22 and the lever 24 has a generally U-shaped cross-section. The width of the lever 24 is somewhat less than that of the handle 22 so that the lever 24 fits into the hollow cavity of the handle 22. The lever 24 has a curved hand-guard 25 at its lower end.

Thus, nicely rounded surfaces of the handle 22 and lever 24 form comfortable gripping surfaces for the hand of the user.

DISPENSING OPERATION

In operation, the container 12 is filled with granular material to be dispensed. It should be understood that the term "granular material" includes not only materials such as sugar and salt which consist of relatively large granules, but also encompass any dry material which is relatively free-flowing.

The cover 14 forms a relatively smooth but tight fit so that it will stay in place without screw threads. Of course, screw threads can be used, if desired or necessary.

With the container 12 filled with material, e.g., salt, the dispensing device 10 is held in one hand by means of the handle 22, positioned above the location where the materials are to be dispensed, and the lever 24 is pulled until it will go no further. When this position is reached, a "click" generator shown schematically at 90 in FIG. 2 provides an audible "click" and a tactile stimulus indicating that a full stroke has been made. This is valuable to insure dispensing a full measure of material.

Then, the lever 24 is released, and the spring 78 (FIG. 2) returns the disc assembly to its starting position and the dispensing cycle is completed.

The result is that a relatively large quantity of material has been dispensed simultaneously from each of a plurality of different holes dispersed around the periphery of the bottom wall of the container during a single operation of the device. In addition, the frustro-conical deflector 46 spreads the dispensed materials over an area even broader than that covered by the hole patterns in the discs.

As it is shown in FIGS. 4–6 and 2, the diameter of the frustro-conical deflector 46 is somewhat less than the distance between the outermost ends of two opposed slots in the lower disc. Thus, some material falls through the holes 40 straight downwardly.

The dispensing operation can be repeated as many times as is necessary to distribute the desired amount of material.

When used in distributing salt over relatively large surface areas, such as over the surface of french fries spread out to drain or popcorn in a large container, the dispensing device is extremely fast, easy to use, and accurate in the amount of salt applied. It also distributes the salt relatively evenly over a wide surface area. The device is easy to use with one hand, thus leaving the other hand free for other tasks.

The device 10 can be used to distribute salt or other condiments over other relatively broad surface areas, such as those of large kettles, trays of food, etc. with similar results. For example, sugar can be spread over the tops of a large number of pastries on a tray.

CLICK GENERATOR

FIGS. 12 and 13 show the details of the click generator 90, which is illustrated only schematically in FIG. 2, for the sake of clarity in the drawings.

The click generator 90 includes an arm 92 pivotably mounted at 93 and having a left end biased away from the wall of the base 21 by a spring 94. The arm 92 has a curved lower edge, and a sharp left-hand edge. A support structure 95 is shown in dashed outlines and is used to strengthen the mounting of the arm 92 and keep it from moving vertically; that is, perpendicularly to the plane of the paper of the drawing.

A pawl structure 96 is attached to the lower end of the lever 24. The structure 96 includes an upstanding tab 104, a pawl 98 which is pivoted at point 100, and a spring 102 extending between the member 104 and the pawl. A post 99, whose crosssection is triangular with one curved side, is mounted in a position so that the pawl 98 is thrust against the left edge of the post 99 by the spring 102.

The relative positions of the parts of the click generator are shown in FIG. 12 with the handle in its rest position.

FIG. 13 shows the click generator when the lever 24 has been pulled all the way back. As the handle moves to the left, the arm 92 slips over the end of the pawl 98 and is quickly thrust against the post 99 by the spring 94, thus creating a loud "click"—that is, an audible sound, as well as a tactile sensation. At this point, the user of the dispensing devices knows that he or she has pulled the lever 24 far enough to produce a complete stroke which will guarantee the maximum dispensed quantity of granular materials from the dispenser.

When the handle 24 is released, the spring 78 (FIG. 12) moves the lever 24 to the right. The left edge of the arm 92 engages the pawl 98 and causes it to swing about its pivot 100, compressing the spring 102. Thus, the arm 92 rides over the pawl 98, and the spring 94 is compressed and the arm 92 is returned to the position shown in FIG. 12, ready for another operation.

As the pawl 98 moves past the arm 92, the pawl 98 snaps back and hits the post 99 to form a second "click". Thus, a properly completed stroke would produce two "clicks".

It should be understood that other devices can be used as a click generator instead of the one described.

LINEAR EMBODIMENT

FIGS. 14–16 show an embodiment of the invention in which the dispensing motion is linear instead of rotary.

Referring to FIG. 14, the dispenser 110 includes a rectilinear container 112 supported by a hollow base 114 and having a handle structure 16 as in the rotary embodiment described above.

Two perforated panels 116 and 120 are secured adjacent the bottom of the container 112, There is a space between the panels and a horizontal slot 121 (FIG. 16) into which a third perforated panel 118 slides.

Each panel has a plurality of holes such as the holes 124 in the panel 116 shown in FIG. 15. The holes in each panel are the same size, shape, and are equidistant from the sides 113 and 115 of the container 112. Preferably, the holes are arranged in rows and columns as shown in FIG. 15. The holes 124 are shown elongated, but they can be of any desired shape.

Although the spacing of the holes from one another is the same in each panel, the spacing of the holes from the walls 117 and 119 is different, as shown in FIG. 16.

The center panel 118 is movable relative to the other panels in the direction indicated by the arrow "M" in FIG. 16. The spacing "X" of the holes from one another in the direction "M" in each panel is at least three times the width "W" of each hole.

When the panels are in the rest or starting position shown in solid lines in FIG. 16, the holes 124 and 126 are aligned, while the outlets of hole 126 are blocked by the solid portion of the bottom panel 120. The holes 124 in the top panel are spaced from the holes 128 in the bottom panel by a distance "Y" which is approximately twice the width "W" of each hole.

When the middle panel 118 is moved linearly to the left in the direction "M", the holes 126 are filled with material to be dispensed. When the middle panel has moved by the distance "W", the top inlets of the holes 126 are covered by the solid areas of the panel 116.

When the panel 118 has moved all the way out to the position 136, the holes 126 will be aligned with the holes 128 and the material will be dispensed through the holes 128. The material is dispersed over a wide area by the broad extent of the panels. The material is spread even further by a deflector 122 (FIG. 14) which is like the deflector 46 but shaped like a truncated pyramid rather than a frustrum of a cone.

The linear motion of the embodiment 110 is particularly simple to achieve. The end 130 of the middle panel 118 normally protrudes through the slot and beyond the walls of the container. It has a hole 132 (FIG. 15). A pin 134 (FIG. 14) extends from the lower end of lever 24 through the hole 132.

When the lever 24 is squeezed, the middle panel 118 is pulled out to the position 136 to dispense material, and then the spring 78 returns the lever 24 and panel 118 to their starting positions. Stops (not shown) are provided to limit the motion of the panel 118 to the desired distance.

A "click" generator can be used with this embodiment as well as the rotary embodiment.

To prevent jamming, spacers (not shown) are provided at opposite edges of either the top panel 116 or the middle panel 118 to space those panels apart by a distance greater than, and preferably twice, the average particle size of the material being dispensed.

MATERIALS AND MANUFACTURING METHODS

Preferably, all parts of the dispensers are molded of plastic, with the exception of the coil spring 78 and the springs of the click generator. Although threaded fasteners are shown at 84 and 86 in FIG. 2, and at 48 in FIGS. 4–6, it is preferred that ultrasonic welding and staking and similar techniques be used to fasten the parts together, wherever possible.

It is preferred that the discs 30, 32 and 34 be made of nylon, and that the container 12 be molded of a clear polycarbonate plastic. The remainder of the device 10 preferably is molded of opaque polycarbonate plastic.

The discs 30, 32 and 34 are shown in FIGS. 1–10 as solid discs. Preferably they are molded as shown in FIGS. 17–20.

The top disc 30 shown in FIG. 17 has a relatively thin wall with an upstanding rim 140 for rigidity.

The middle disc 32 (FIGS. 18 and 20) has a thin wall disc 148 with a depending rim 142 and vertical walls such as 144 and 146 around each slot 38 to keep the holes from leaking materials sideways.

The bottom disc 34 (FIG. 19) has a thin wall with a depending rim 150.

Similarly, the panels 116, 118 and 120 of the linear embodiment of FIGS. 14–16 also can be molded to reduce material usage and cost.

VARIATIONS

In the rotary embodiment of the invention, it is possible to change the arrangement of the three discs without changing the operation of the device. Instead of fixing the center disc 32 to the container and rotating the combination of discs 30 and 34, discs 30 and 34 can be secured to the container and the center disc 32 rotated.

Similarly, in the linear embodiment, the top and bottom panels 116 and 120 can be fastened together and the central panel 118 can be secured to the container, without changing the mode of operation of the device. Two slots would be made in the container wall to accommodate and give access to the siding panels.

The quantity of material dispensed per cycle of operation can be changed by varying the thickness of the center disc 32 or panel 118, as well as by changing the size of the holes.

The above description of the invention is intended to be illustrative and not limiting. Various changes or modifications in the embodiments described may occur to those skilled in the art. These can be made without departing from the spirit or scope of the invention.

What is claimed is:

1. A measuring dispenser, said dispenser comprising, in combination:
    a container for holding granular material to be dispensed, said container having at least one side wall, an end wall and a cover structure, said end wall having a substantial thickness and a plurality of dispersed holes therethrough,
    said cover structure forming said holes into a plurality of measuring chambers dispersed over the surface of end wall, said holes having inner and outer openings, said cover structure comprising an inner cover member for selectively covering and uncovering said inner openings of all of said holes during one cycle of operation by relative rotation of said inner cover member and said end wall, and an outer cover member for selectively covering and uncovering said outer openings of said holes during one cycle of operation to dispense measured quantities of said materials by relative rotation of said outer cover member and said end wall.

2. A device as in claim 1 in which each of said inner and outer cover members has holes of the same size, shape and location relative to one another as said holes in said end wall, with solid material between said holes, and including a drive structure for selectively moving said inner and outer cover members and said end wall relative to one another to cause the holes in said cover members to be selectively aligned with said holes in said end wall.

3. A device as in claim 2 in which said end wall and said cover members are discs, said holes are symmetrically-spaced radially-elongated holes in said discs, adjacent ones of said holes being located angularly spaced from one another by at least three times the angular width of one of said holes, the holes in said inner disc being angularly offset from the holes in said outer disc by at least twice the angular width of one of said holes, said drive structure being adapted to rotate said end wall disc and said inner and outer discs relative to one another for selectively covering and uncovering said chambers.

4. A device as in claim 1 including a deflector positioned adjacent said outer cover member to spread dispensed materials over an enlarged area.

5. A method of applying measured quantities of granulated materials onto food surfaces spread over a substantial area, said method comprising the steps of:
    placing said granulated materials in a measuring dispenser, said dispenser comprising in combination,
    a container for holding granular material to be dispensed, said container having at least one side wall, an end wall, and a cover structure; said end wall having a substantial thickness and a plurality of dispersed holes therethrough;
    said cover structure forming said holes into a plurality of measuring chambers dispersed over the surface of said end wall, said holes having inner and outer openings, said cover structure comprising an inner cover member for selectively covering and uncovering, by relative rotational movement of said inner cover member and said holes, said inner openings of all of said holes during one cycle of operation, and an outer cover member for selectively covering and uncovering by relative rotational movement of said inner and outer cover members and said outer openings of said holes during one cycle of operation to dispense measured quantities of said materials;
    holding said dispenser over said food surfaces;
    actuating said dispenser mechanism to cause said relative rotational movement of said inner and outer cover members and to dispense said measured quantities of materials from said measuring chambers onto said food surfaces.

6. A method as in claim 5 which each of said inner and outer cover members has holes of the same size, shape and location relative to one another as said holes in said end wall, with solid material between said holes, and including a drive structure for selectively rotating said inner and outer cover members and said end wall relative to one another to cause the holes in said cover members to be selectively aligned with said holes in said end wall, wherein
    said actuating step comprises manually actuating said drive structure.

7. A method as in claim 6 in which said dispenser has a handle usable to hold said dispenser above said food surfaces in a position to dispense said materials downwardly onto said surfaces, said drive structure being located adjacent said handle, said actuating step comprising actuating said drive structure with the same hand used to hold said dispenser by means of said handle.

8. A method as in claim 7 in which said end wall and said cover members are discs, said holes are symmetrically-spaced radially-elongated holes in said discs, adjacent ones of said holes being located angularly spaced from one another by at least three times the angular width of one of said holes, the holes in said inner disc being angularly offset from the holes in said outer disc by at least twice the angular width of one of said holes, said drive structure being adapted to rotate said end wall disc and said inner and outer discs relative to one another for selectively covering and uncovering said chambers.

9. A measuring dispenser for dispensing pre-measured quantities of granular material, said dispenser comprising, in combination;

a container for holding a supply of said material, said container having at least one side wall and an end wall, said end wall comprising first, second and third discs, each of said discs having a plurality of angularly-spaced apart holes of substantially the same size and shape, the angular spacing between adjacent holes being substantially the same in each of said discs, said discs being superimposed upon one another with said second disc between said first and third discs, said first and third discs being secured together to form a disc combination, said second disc and said disc combination being rotatable with respect to one another, said holes in said first and third discs being angularly offset from one another by at least twice the angular width of one of said holes, said holes of said second disc defining a volume of the material to be dispensed that corresponds to said pre-measured quantity, and an actuating device operable for rotating said second disc and said disc combination relative to one another to dispense said material contained in the holes of said second disc through a plurality of said holes in said third disc during one dispensing operation.

10. A device as in claim 9 in which the angular spacing of said holes from one another in each of said discs is approximately equal to three times the angular width of each of said holes in said disc.

11. A device as in claim 9 in which each of said holes is a radially-extending slot elongated in the radial direction on said disc and having a radially innermost end and a radially outermost end, said slot being wider at said outermost end than at said innermost end.

12. A device as in claim 9 in which said actuating device comprises a handle structure secured to said container, said handle structure being spaced outwardly from said container and having a handle member extending in a direction generally perpendicular to the planes of said discs, said handle structure having a pivotable lever movable by squeezing said lever and said handle member together, and a drive linkage linking said lever to at least one of said discs to rotate said second disc and said disc combination relative to one another.

13. A device as in claim 12 in which said handle structure includes a hollow base extending underneath and outwardly from said container adjacent said end wall of said container, said handle member extending transversely to said base, said lever being pivoted to said handle member at a point spaced upwardly from said base.

14. A device as in claim 9 including a spacer to space said first and second discs apart from one another by a distance greater than the average diameter of one of the grains of said material to substantially prevent leakage and binding of the discs together.

15. A device as in claim 9 in which said actuating device includes a hand-actuatable lever mechanism, a crank arm pivotably connected at one end to said lever mechanism and at the other to one of said discs at a point spaced from the center thereof for rotation of said second disc and said disc combination relative to one another.

16. A device as in claim 15 including resilient means for returning said lever to its starting position after each hand-operated movement thereof, and thereby generating reciprocating movement of said second disc and said disc combination relative to one another.

17. A device as in claim 16 including stops for stopping the movement of said lever in each direction of its motion to limit the rotation of said discs to that needed to empty one pre-measured load of material from said holes in said second disc.

18. A device as in claim 9 including means for developing an audible sound and/or tactile sensation when said lever is moved to a pre-determined position constituting a full stroke.

19. A device as in claim 9 including a generally frustro-conical deflector secured below said third disc to spread said material outwardly from the center of said discs as it falls from said third disc.

20. A device as in claim 14 in which said distance is no greater than approximately twice said average diameter.

21. A device as in claim 9 in which each of said discs is molded and has a relatively thin circular member with holes in it, and an integral outer rim around the exterior of said circular member and extending perpendicularly to said circular member.

22. A device as in claim 21 in which each of said holes in at least the middle of said discs is rimmed with an integral flange extending perpendicularly to said circular member in the same direction as said outer rim.

23. A measuring dispenser for dispensing pre-measured quantities of granular material, said dispenser comprising:

a container for holding a supply of said material and an actuating device for dispensing said material;

said container having at least one side wall and an end wall, said end wall comprising first, second, and third discs and a spacer to space said first and second discs apart from one another by a distance greater than the average diameter of grains of the granular material to be dispensed;

each of said discs having a plurality of angularly-spaced apart holes of substantially the same size and shape, the angular spacing between adjacent holes being substantially the same in each of said discs, said discs being superimposed upon one another with said second disc between said first and third discs, said first and third discs being secured together to form a disc combination, said second disc and said disc combination being rotatable with respect to one another, said holes in said first and third discs being angularly offset from one another by at least twice the angular width of one of said holes; and said actuating device being operable for rotating said second disc and said disc combination relative to one another to dispense said material from said plurality of holes in said third disc during one dispensing operation.

24. A measuring dispenser, said dispenser comprising, in combination:

a container for holding a quantity of granular material, said container having at least one side wall and a bottom wall, said bottom wall including at least one opening and at least one dispensing member for dispensing pre-measured quantities of said material through said at least one opening in response to rotational movement of said dispensing member, a hollow base for supporting said container on a support surface, said base extending outwardly from said container in a direction generally parallel to said bottom wall, a handle extending upwardly from said base at a location spaced from said container, a lever connected to said dispensing member to rotate said dispensing member to dispense a measured quantity of said material, said lever being located closely adjacent to said handle and being operable by the same hand that holds said handle.

25. A device as in claim 24 in which said lever is pivoted to said handle at a position spaced upwardly from said base, said lever being movable towards and away from said handle by pressure from the grip of a hand, said base having a top wall with a hole in it, the lower end of said lever extending downwardly through said hole, and an actuating linkage within said hollow base connected between said lower end of said lever and said dispensing member.

26. A device as in claim 25 in which each of said handle and said lever has a U-shaped cross-section, one being narrower than the other and nesting within the other with the open ends of the U-shapes facing one another.

27. A device as in claim 24 in which said dispensing member comprises at least one of three discs overlying one another in a predetermined angular relationship, each having a plurality of holes shaped and spaced from one another so as to form a series of measuring cavities which are covered at the bottom before a dispensing operation, with the tops of said cavities open to receive material from said container, and which are successively closed at the top, opened at the bottom and opened at the top by the rotation of said one disc through a pre-determined angle in a reciprocating motion, said device holding said dispenser over said food surfaces, and actuating said dispenser mechanism to deposit and spread said measured quantities of materials onto said food surfaces.

* * * * *